United States Patent
Virupaksha

(10) Patent No.: US 11,735,160 B2
(45) Date of Patent: Aug. 22, 2023

(54) SYSTEM AND METHOD FOR ANNOUNCING THE CORRECT PRONUNCIATION OF TRAVELERS' NAMES

(71) Applicant: Rockwell Collins, Inc., Cedar Rapids, IA (US)

(72) Inventor: Deepak Virupaksha, Tumkur (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 407 days.

(21) Appl. No.: 17/142,630

(22) Filed: Jan. 6, 2021

(65) Prior Publication Data
US 2022/0165251 A1    May 26, 2022

(30) Foreign Application Priority Data
Nov. 20, 2020    (IN) .............................. 202041050624

(51) Int. Cl.
| | |
|---|---|
| *G10L 13/08* | (2013.01) |
| *G10L 13/033* | (2013.01) |
| *G06K 7/14* | (2006.01) |
| *G06F 16/632* | (2019.01) |
| *G06F 16/68* | (2019.01) |

(52) U.S. Cl.
CPC ............ *G10L 13/08* (2013.01); *G06F 16/632* (2019.01); *G06F 16/686* (2019.01); *G06K 7/1413* (2013.01); *G10L 13/033* (2013.01)

(58) Field of Classification Search
CPC ..... G10L 13/08; G10L 13/033; G06F 16/632; G06F 16/686; G06K 7/1413
See application file for complete search history.

(56) References Cited

U.S. PATENT DOCUMENTS

| | | |
|---|---|---|
| 5,850,435 A | 12/1998 | Devillier |
| 7,172,113 B2 | 2/2007 | Olenick et al. |
| 8,913,731 B2 | 12/2014 | Fujita-Yuhas |
| (Continued) | | |

FOREIGN PATENT DOCUMENTS

| | | | |
|---|---|---|---|
| CN | 102982800 A | * | 3/2013 |
| CN | 107563246 A | | 1/2018 |
| (Continued) | | | |

*Primary Examiner* — Linda Wong
(74) *Attorney, Agent, or Firm* — Suiter Swantz pc llo

(57) ABSTRACT

A method for announcing the correct pronunciation of travelers' names is disclosed. The method may include retrieving a traveler ID from a tag on a travel document; determining whether a remote database includes a stored audio recording associated with the retrieved traveler ID; collecting an audio recording if the remote database does not include the stored audio recording associated with the retrieved traveler ID using an audio recording device; receiving the audio recording in a non-standardized format from the audio recording device; converting the audio recording received in the non-standardized format to a standardized format; retrieving traveler data; storing the converted audio recording in the standardized format in the remote database along with the retrieved traveler ID and the retrieved traveler data; retrieving the converted audio recording from the remote database; and generating control signals configured to cause an audio speaker device to play the retrieved audio recording.

15 Claims, 12 Drawing Sheets

(56) References Cited

U.S. PATENT DOCUMENTS

| | | | |
|---|---|---|---|
| 9,245,018 B2 | 1/2016 | Mack | |
| 9,343,069 B2 | 5/2016 | Redfern et al. | |
| 9,747,891 B1 | 8/2017 | Abuelsaad et al. | |
| 10,637,981 B2 | 4/2020 | Manav | |
| 10,762,404 B1 | 9/2020 | Correa et al. | |
| 10,893,347 B2 * | 1/2021 | Lo | G06K 19/0723 |
| 2013/0341389 A1 | 12/2013 | Roderique et al. | |
| 2018/0075156 A1 * | 3/2018 | Broselow | G06K 7/10861 |

FOREIGN PATENT DOCUMENTS

| | | |
|---|---|---|
| DE | 202018107285 U1 | 7/2019 |
| JP | 5199221 B2 | 5/2013 |

* cited by examiner

| Traveler ID | Traveler Name | Traveler Name's Audio Recording |
|---|---|---|
| 12367 | Traveler A | 12367.format |
| 53668 | Traveler B | 53668.format |
| 25793 | Traveler C | 25793.format |
| ' | ' | ' |
| ' | ' | ' |
| ' | ' | ' |
| ' | ' | ' |
| ' | ' | ' |
| ' | ' | ' |
| ' | ' | ' |
| ' | ' | ' |
| Traveler ID | First Name Last Name | Traveler ID.format |

| Departure Date | Flight Number | Departure Airpot | Arrival Airpot | TNAT |
|---|---|---|---|---|
| 10/10/2020 | AA 7003 | ORD | LHR | 10102020_AA7003_ORD_LHR |
| 10/10/2020 | AA 7003 | LHR | ORD | 10102020_AA7003_LHR_ORD |
| 10/10/2020 | AA 7004 | DXB | LHR | 10122020_AA7004_DXB_LHR |
| 10/12/2020 | AA 7005 | MDW | ORD | 10152020_AA7005_MDW_ORD |
| 10/15/2020 | AA 7006 | CUU | MDW | 10152020_AA7006_CUU_MDW |
| 10/15/2020 | AA 7007 | CKG | DXB | 10152020_AA7007_CKG_DXB |
| 10/15/2020 | AA 7008 | BLR | ORD | 10152020_AA7008_BLR_ORD |
| mm/dd/yyyy | Flight Number | Departure Airpot Code | Arrival Airport Code | mm/dd/yyyy_flight#_departure_arrival |

FIG. 4B

SYSTEM AND METHOD FOR ANNOUNCING THE CORRECT PRONUNCIATION OF TRAVELERS' NAMES

CROSS-REFERENCE TO RELATED APPLICATIONS

The present application claims the benefit of India Provisional Patent Application No. 202041050624, filed Nov. 20, 2020, entitled SYSTEM AND METHOD FOR ANNOUNCING THE CORRECT PRONUNCIATION OF TRAVELERS' NAMES, naming Deepak Virupaksha as inventor, which is incorporated by reference in the entirety.

BACKGROUND

Airport personnel frequently need to make various traveler-related announcements that require an immediate response from travelers. During the announcements, the airport personnel are required to pronounce the traveler's name. However, the airport personnel often have difficulty pronouncing the traveler's name correctly, which hinders the traveler's ability to respond quickly.

SUMMARY

A system for announcing the correct pronunciation of travelers' names is disclosed, in accordance with one or more embodiments of the disclosure. In one embodiment, the system includes one or more controllers communicatively coupled to one or more user devices, the one or more controllers including one or more processors configured to execute one or more program instructions causing the one or more processors to: retrieve a traveler ID from a tag on a travel document using a scanning device of the one or more user devices; determine whether a remote database includes a stored audio recording associated with the retrieved traveler ID; collect an audio recording if the remote database does not include the stored audio recording associated with the retrieved traveler ID using an audio recording device of the one or more user devices, the audio recording device being configured to record the pronunciation of a traveler name; receive the audio recording in a non-standardized format from the audio recording device; convert the audio recording received in the non-standardized format to a standardized format; retrieve traveler data associated with the retrieved traveler ID, the traveler data including a name of a traveler; store the converted audio recording in the standardized format in the remote database along with the retrieved traveler ID and the retrieved traveler data; retrieve the converted audio recording from the remote database based on the retrieved traveler ID; and generate one or more control signals configured to cause an audio speaker device of the one or more user devices to play the retrieved audio recording.

In some embodiments, the one or more controllers may be configured to retrieve the converted audio recording from the remote database in response to a user input.

In some embodiments, the user input may include entering the retrieved traveler ID manually into a search field of a user interface of the one or more user devices.

In some embodiments, the user input may include entering the retrieved traveler ID by scanning the tag of the travel document.

In some embodiments, the one or more controllers may be further configured to generate a table in response to a user input of one or more flight details, the table including the retrieved traveler ID, the stored audio recording, the one or more flight details, and the retrieved traveler data. The one or more controllers may be further configured to store the generated table in the remote database. The one or more controllers further configured to retrieve the table in response to a user input of the one or more flight details and retrieve the converted audio recording from the remote database in response to a user selection of the stored audio recording in the retrieved table.

In some embodiments, the one or more user devices may include a mobile device.

In some embodiments, the scanning device may include a camera of the mobile device.

In some embodiments, the one or more user devices may include a desktop computer.

In some embodiments, the scanning device may include a barcode reader.

In some embodiments, the one or more user devices may include a self-check-in kiosk including a barcode reader.

In some embodiments, the audio recording device may be configured to record a traveler pronounce their name.

In some embodiments, the audio recording device may be configured to record a traveler pronounce a family member's name.

In some embodiments, the audio recording device may be configured to record a voice-assisted model pronounce the name of a traveler in a standard voice of the voice-assisted model.

In some embodiments, an output of the audio speaker device of the one or more user devices may be amplified by placing the audio speaker device of the user device in close proximity to an intercom system.

A method for announcing the correct pronunciation of travelers' names is disclosed, in accordance with one or more embodiments of the disclosure. In one embodiment, the method includes retrieving a traveler ID from a tag on a travel document. In another embodiment, the method includes determining whether a remote database includes a stored audio recording associated with the retrieved traveler ID. In another embodiment, the method includes collecting an audio recording if the remote database does not include the stored audio recording associated with the retrieved traveler ID using an audio recording device, the audio recording device being configured to record the pronunciation of a traveler name. In another embodiment, the method includes receiving the audio recording in a non-standardized format from the audio recording device. In another embodiment, the method includes converting the audio recording received in the non-standardized format to a standardized format. In another embodiment, the method includes retrieving traveler data associated with the retrieved traveler ID. In another embodiment, the method includes storing the converted audio recording in the standardized format in the remote database along with the retrieved traveler ID and the retrieved traveler data. In another embodiment, the method includes retrieving the converted audio recording from the remote database based on the retrieved traveler ID. In another embodiment, the method includes generating one or more control signals configured to cause an audio speaker device to play the retrieved audio recording.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4A illustrates a table of data/information stored in a remote database of the system, in accordance with one or more embodiments of the disclosure;

FIG. 4B illustrates a table of data/information stored in the remote database of the system, in accordance with one or more embodiments of the disclosure;

DETAILED DESCRIPTION OF THE INVENTION

Figure 1:
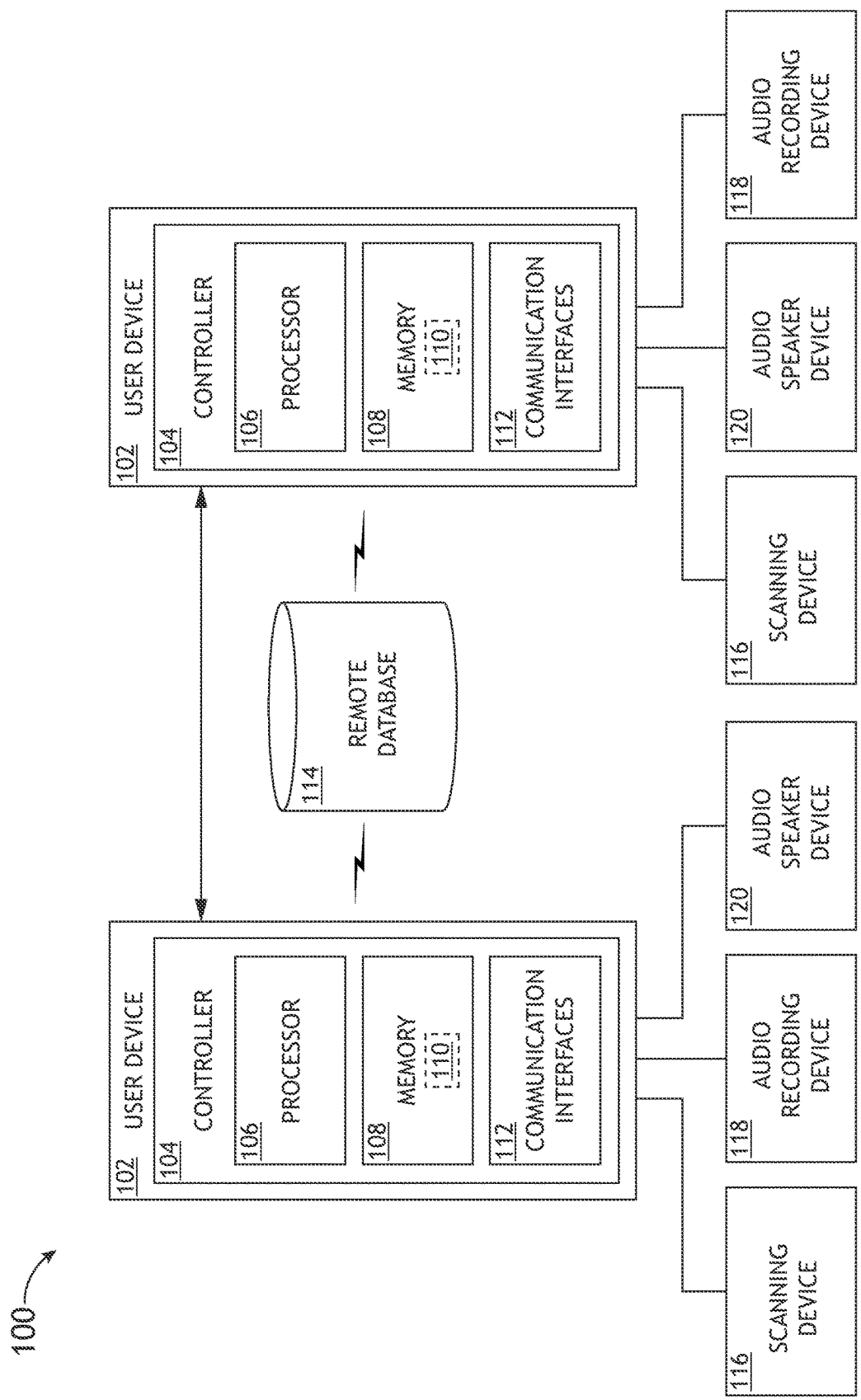
FIG. 1 illustrates a simplified block diagram of a system for announcing the correct pronunciation of travelers' names, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIGS. 1-6 generally illustrate a system and method for announcing the correct pronunciation of a traveler's name, in accordance with one or more embodiments of the disclosure.

Airport personnel frequently need to make traveler-related announcements that require an immediate response from travelers. For example, the gate agent may need to make an announcement to alert travelers that the boarding gate has changed. By way of another example, the gate agent may need to make an announcement to alert travelers that the gate will be closing shortly (e.g., make a final call for departure announcement). By way of another example, the gate agent may need to make an announcement to alert one or more travelers that they have been removed from the standby list. By way of another example, the gate agent may need to make an announcement to alert one or more travelers that their seat assignment has been changed (e.g., upgraded, or the like) or that a seat assignment has been made (e.g., if a seat assignment was not indicated on the boarding pass). By way of another example, airport personnel may need to make security-related announcements. By way of another example, the airport personnel may need to make an announcement to alert one or more travelers that there were issues with checked baggage (or luggage).

During the announcements, the airport personnel are often required to pronounce the traveler's name. However, airport personnel often have difficulty pronouncing the traveler's name correctly, which hinders the traveler's ability to respond quickly. In particular, many airport personnel have difficultly pronouncing rare or strange names, such as foreign national names, and have difficulty knowing which part of the name should come first and/or last. If a traveler's name is mispronounced over the intercom, the traveler is unable to recognize that the announcement is directed towards them and is unable to respond immediately. For example, if a gate agent calls a traveler by the wrong first name, the traveler is unable to recognize that the gate agent is requesting their presence at the gate.

As such, it would be beneficial to have a system and method by which airport personnel may easily announce any traveler's name without mispronouncing that traveler's name and in a voice that is familiar to the traveler (e.g., in the voice of the traveler or someone they are familiar with). If a traveler hears their name announced in their own voice (or a voice they are familiar with) the traveler will recognize the voice and be able to respond quickly. Further, the traveler will be able to respond even when they are semi-unconscious (e.g., even when traveler jet lagged) because they will be able to recognize the voice. The audio clips stored in the remote database will be recorded in different voices, such that the announcement of common names such as John Smith, will not confuse other travelers with the same name.

FIGS. 1-5D in general illustrate a system 100 for announcing the correct pronunciation of travelers' names, in accordance with one or more embodiments of the disclosure.

Figure 2A:
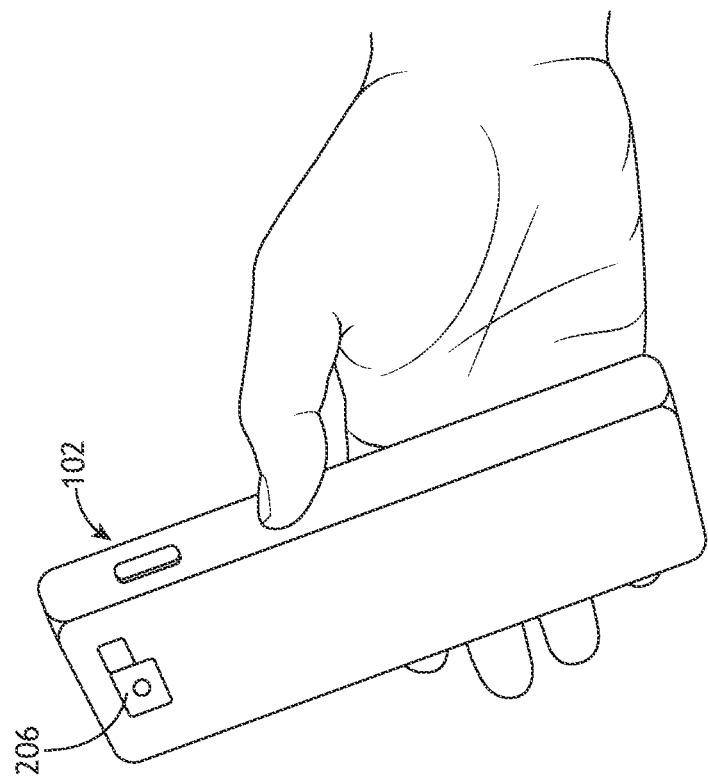
FIG. 2A illustrates a simplified schematic of the system for announcing the correct pronunciation of travelers' names, in accordance with one or more embodiments of the disclosure.
Figure 2A:
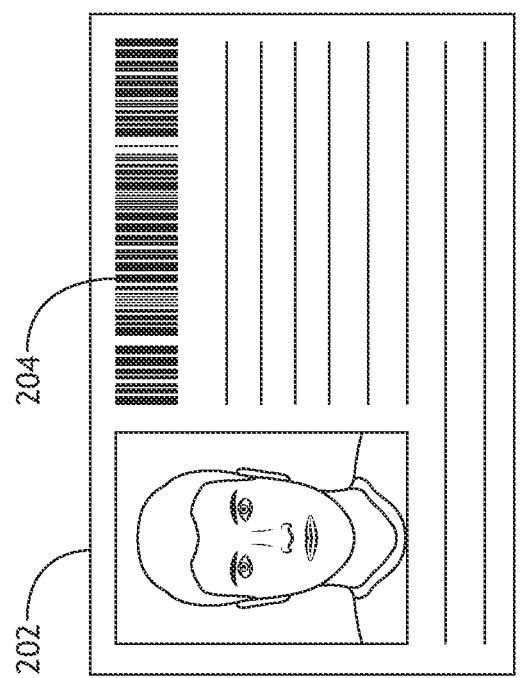
Figure 2B:
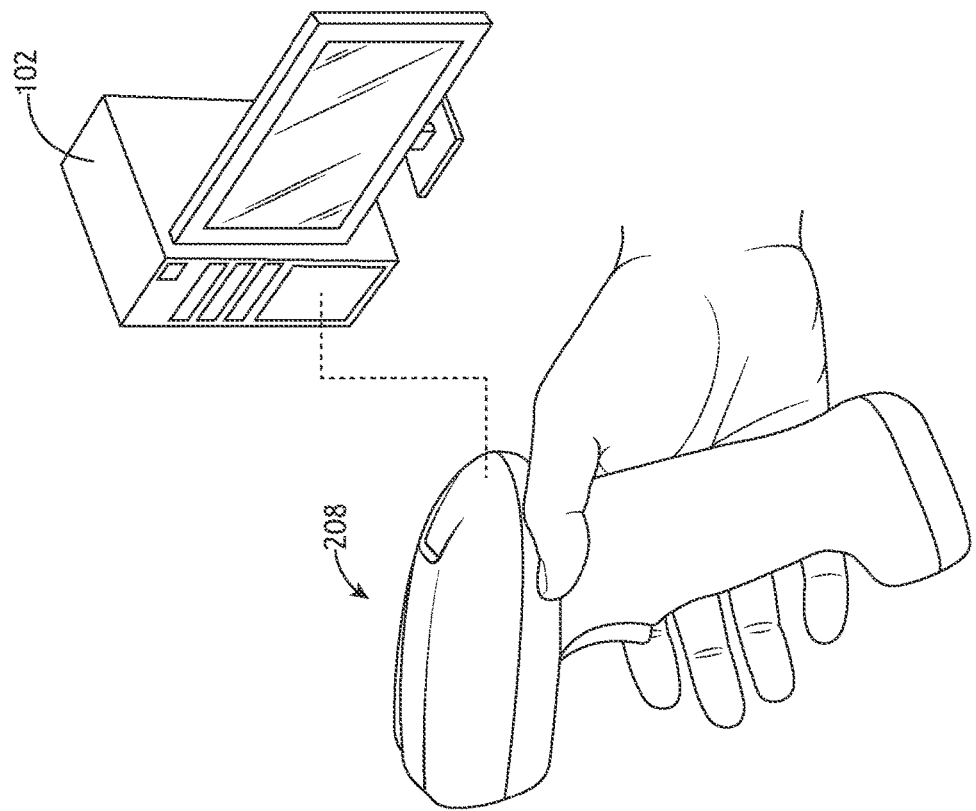
FIG. 2B illustrates a simplified schematic of the system for announcing the correct pronunciation of travelers' names, in accordance with one or more embodiments of the disclosure.
Figure 2B:
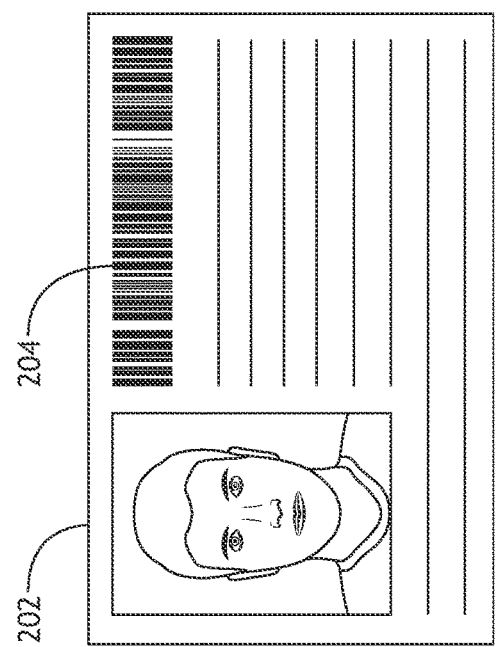
Figure 3A:
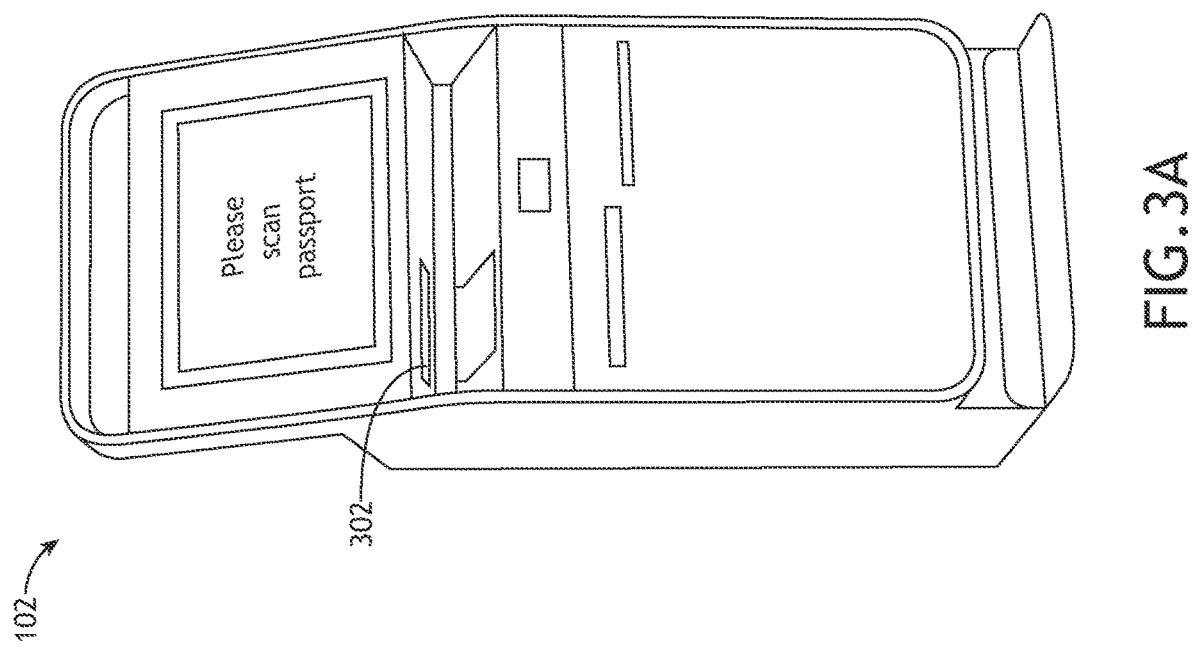
FIG. 3A illustrates a simplified schematic of the system for announcing the correct pronunciation of travelers' names, in accordance with one or more embodiments of the disclosure.
Figure 3B:
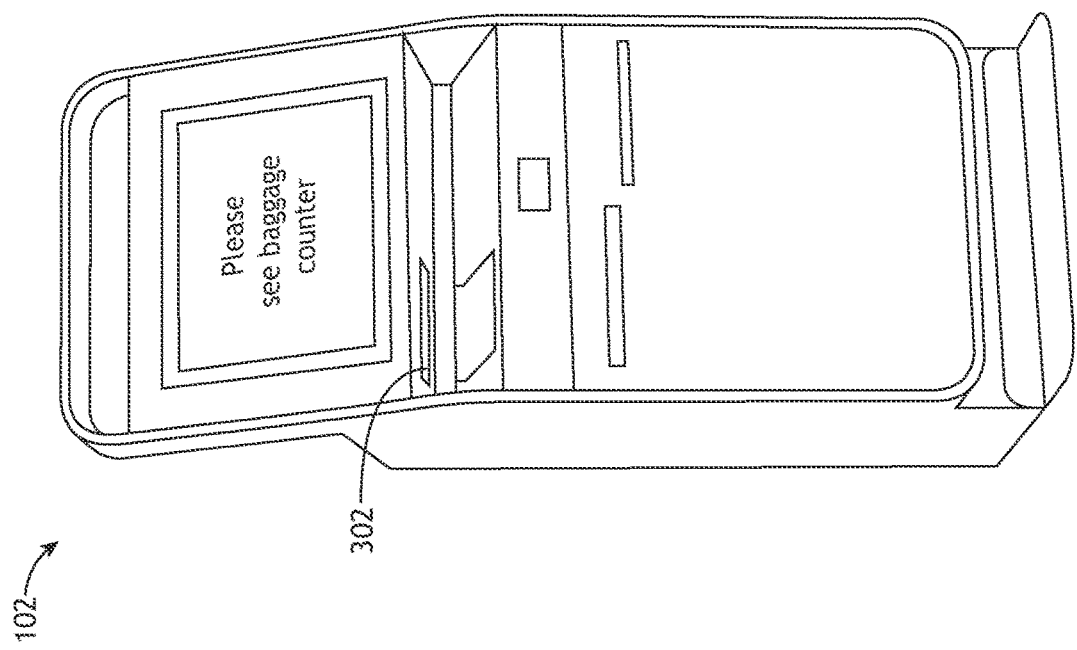
FIG. 3B illustrates a simplified schematic of the system for announcing the correct pronunciation of travelers' names, in accordance with one or more embodiments of the disclosure.

The system 100 may include one or more user devices 102. The one or more user devices 102 may include any user device known in the art. For example, as shown in FIG. 2A, the user device 102 may include a smartphone or similar mobile device (e.g., a tablet, or the like). By way of another example, as shown in FIG. 2B, the user device 102 may include a computer (e.g., a desktop computer, laptop computer, or the like). It is noted herein that although FIG. 2B illustrates a desktop computer 102, the user device 102 may include any computer device known in the art including, but not limited to, a desktop computer, laptop computer, or the like. By way of another example, as shown in FIGS. 3A-3B, the user device 102 may include a check-in kiosk (e.g., an airline check-in kiosk).

The system 100 may include one or more controllers 104 communicatively coupled to the one or more user devices 102. The one or more controllers 104 may include one or more processors 106 and memory 108. The memory 108 may store one or more sets of program instructions 110. The one or more processors 106 may be configured to execute the one or more sets of program instructions to carry out one or more various steps described throughout the disclosure.

The one or more controllers 104 may include one or more communication interfaces 112. For example, the one or more communication interfaces 112 may communicate via wired means or via wireless means (e.g., via Bluetooth, Wi-Fi, Near Field Communication (NFC), or the like), where the one or more communication interfaces may be configured to receive data, transmit data, transmit power, or otherwise interact with the other controllers or the remote database 114.

The system 100 may include an application installable on the end user's user device 102 which provides an interface to scan a travel document 202. Referring to FIGS. 2A-2B, the travel document 202 (e.g., a passport 202, boarding pass, driver's license, train ticket, plane ticket, or the like) may include a tag 204. For example, the tag 204 may incorporate a barcode, QR-code, or similar machine-readable encoding to encode traveler identification (ID) information (e.g., name, residence information, birth date, passport number, social security number, contact information, and the like). For instance, the tag 204 of the passport 202 and its incorporated code may correspond to a traveler ID unique to that traveler. In this regard, the unique traveler ID encoded in the barcode may be different for each traveler, such that a remote database 114 can store traveler data along with the unique traveler ID, which is discussed further herein.

The system 100 may include a scanning device 116. For example, the user device 102 may include/be coupled to the scanning device 116. The scanning device 116 may be configured to retrieve one or more unique traveler identifications (IDs) from the one or more travel documents 202. For example, the user device 102 may be equipped with barcode scanner functionality. For instance, the user device 102 (e.g., mobile device) may include a camera 206 configured to scan and decode the tag 204. In another instance, the user device 102 (e.g., kiosk 300) may include a barcode reader 302. In this regard, when the tag 204 on the traveler's travel document 202 (e.g., passport 202) is scanned, the user device 102 may retrieve the one or more unique traveler IDs from the barcode. By way of another example, the user device 102 (e.g., a mobile device, desktop computer, laptop, or the like) may be coupled with an external scanning device with barcode scanner functionality. For instance, the user device 102 may couple to a barcode reader 208 configured to scan and decode the tag 204. In this regard, when the tag 204 on the traveler's passport is scanned, the user device 102 may retrieve the one or more unique traveler IDs from the barcode.

It is noted herein that the traveler ID may include any unique identifier associated with the traveler such as, but not limited to, a passport number, social security number, traveler name, birthdate, boarding pass number, ticket number, and the like. For example, as shown in FIG. 4A, the unique traveler ID may include a passport number. Further, it is noted herein that the one or more travel documents may include any travel document known in the art including, but not limited to, a passport, boarding pass, plane ticket, subway ticket, train ticket, driver's license, military ID, and the like.

The system 100 may include an audio recording device 118. For example, the user device 102 may include the audio recording device 118. For instance, the user device 102 may include an internal microphone or other type of audio recording device. By way of another example, the user device 102 may couple to the audio recording device. For instance, the user device 102 may couple to an external microphone or other type of audio recording device. The user device 102 may be communicatively coupled to the audio recording device 118 via any coupling mechanism known in the art. For example, the audio recording device may couple to the user device 102 via any wireless connection. For instance, the audio recording device may be coupled to the user device 102 via Bluetooth, WiFi, or the like. By way of another example, the audio recording device 118 may couple to the user device 102 via any wireline connection. For instance, the audio recording device may be coupled to the user device 102 via cables (e.g., USB cables), wires, or the like.

Although FIG. 1 depicts the audio recording device 118 and the audio speaker device 120 as separate components of the system 100, it is noted herein that the audio recording device 118 may be configured to perform one or more functions of the audio speaker device 120, and vice versa.

The audio recording device 118 may be configured to collect one or more traveler name audio recordings. For example, the audio recording device 118 may be configured to collect one or more audio recordings of travelers pronouncing their names. By way of another example, the audio recording device 118 may be configured to collect one or more audio recordings of travelers pronouncing family member's names. For instance, a parent of a child traveler may record the pronunciation of their child's name. By way of another example, if a traveler is unable to speak or has difficulty speaking, the audio recording device 118 may be configured to record the traveler's name in a standard voice when prompted by an airport staff member. For instance, the airport staff member may ask the traveler to indicate through the use of non-verbal communication whether or not the airport staff member is correctly pronouncing the traveler's name, and if so, the airport staff member can prompt a virtual voice assistant (e.g., Siri, Alexa, Google Assistant, or the like) to pronounce the traveler's name in the standard voice of the virtual voice assistant.

FIG. 4A illustrates a table 400 of the data stored in the remote database 114, in accordance with one or more embodiments of the present disclosure.

The remote database 114 may be configured to store the traveler name audio recording collected by the audio recording device 118 along with information collected by the scanning device 116 (e.g., the information encoded in the tag 204). For example, the remote database 114 may be configured to store the audio recording along with the traveler ID (e.g., passport number) retrieved from the travel document 202. By way of another example, the remote database 114 may be configured to store the audio recording along with traveler's name as it appears on the travel document.

It is noted herein that the system 100 may receive and convert the audio recordings collected by the audio recording device 118 in a non-standardized format to a standardized format prior to storing the audio recordings in the remote database 114. In this regard, user devices operating on different operating systems may nevertheless be able to retrieve the various audio recordings collected by the various user devices. Further, user devices operating on different operating systems may nevertheless be able to retrieve the correct audio recording associated with a specific unique traveler ID (e.g., the audio recording is correctly paired with the unique traveler ID).

For example, the audio recordings may be received in a non-standardized format from the audio recording device 118 and automatically converted into a standardized format prior to storage by the one or more controllers 104. For instance, as shown in FIG. 4A, the one or more controllers 104 may be configured to store the audio recordings in the remote database 114 in a standardized format, such as the format shown in FIG. 4A (e.g., TravelerID.format). By way of another example, the audio recordings may be received in a non-standardized format from the audio recording device 118 and automatically converted into a standardized format prior to storage by a centralized server. For instance, as shown in FIG. 4A, the centralized server may be configured to store the audio recordings in the remote database 114 in standardized format, such as the format shown in FIG. 4A (e.g., TravelerID.format). By way of another example, the audio recordings may be received in a non-standardized format from the audio recording device 118 and manually converted into a standardized format prior to storage by airport personnel. For instance, as shown in FIG. 4A, the airport personnel may be configured to store the audio recordings in the remote database 114 and manually label the audio recordings in a standardized format, such as the format shown in FIG. 4A (e.g., TravelerID.format).

Although FIG. 4A depicts a specific standardized format (e.g., labeling scheme) for storing the audio recording in the remote database, it is noted herein that the audio recording may be stored in the remote database in any standardized format.

It is noted herein that the audio recordings may be in any format known in the art including, but not limited to, mp3, WAV, FLAC, AAC, mp4, and the like. In some embodiments, the system may receive the audio recordings in various file formats and convert the non-standardized file formats into standardized file formats prior to storing in the remote database 114. For example, the one or more controllers 104 may be configured to receive the audio recordings in non-standardized file formats and convert the audio recordings into a standardize file format (e.g., mp3, WAV, FLAC, and the like). By way of another example, the remote database 114 may be configured to receive the audio recordings in non-standardized file formats and convert the audio recordings into a standardize file format (e.g., mp3, WAV, FLAC, and the like). In some embodiments, the system may be configured to receive the audio recordings in various file formats and store the audio recordings in the remote database 114 in the various file formats (e.g., without converting the audio file format into a standardized file format).

Referring to FIG. 4A, the audio recording collected by the audio recording device 118 and the traveler ID retrieved using the scanning device 116 may be stored together in the remote traveler name database 114 (remote database 114). The remote database 114 may store the traveler's name audio recording against the traveler ID (e.g., passport number). The remote database 114 may also store the traveler's name audio recording against traveler data retrieved from the travel document. For example, traveler data may be retrieved from the tag 204 by the scanning device 116 (e.g., traveler name). By way of another example, the traveler data may be manually retrieved and entered (e.g., an airport staff member may manually enter the traveler data shown on the travel document). In this regard, when an airport staff member wants to access the audio recording, the airport staff member may access the application and retrieve the audio recording from the remote database 114.

The audio recording may be retrieved from the remote database 114 when an airport staff member needs to announce the traveler's name. For example, the airport staff member may scan the tag 204 from the traveler's travel document 202 to retrieve the audio recording from the remote database 114. In this regard, the user device 102 may display the tag 204 and an external scanning device 116 may be used to scan the tag 204 to retrieve the audio recording stored in the remote database. In another instance, the airport staff member may have a copy of the tag 204 from the traveler's travel document 202. In this regard, the airport staff member may scan the tag 204 (external to the system 100) to retrieve the audio recording stored in the remote database 114.

By way of another example, the airport staff member may enter the traveler ID of the traveler whose name they wish to pronounce to retrieve the audio recording from the remote database 114.

Referring to FIG. 4B, the remote database 114 may also be configured to store a traveler name announcement table (TNAT) along with one or more flight details of one or more travelers in a table 420. For example, the system 100 may be configured to generate a traveler name announcement table 532 (as shown in FIG. 5D). The traveler name announcement table may include the one or more flight details of the one or more travelers. For example, the traveler name announcement table may include, but is not required to include, flight number, date, departure airport (e.g., source airport code), arrival airport (e.g., destination airport code), and the like.

The traveler name announcement table (TNAT) may be stored in the remote database in a standardized format. For example, the TNAT may be stored in the remote database 114 in a standardized format, such as the format shown in FIG. 4B (e.g., mmddyyyy_flightnumber_sourceairportcode_destinationairportcode). It is noted herein that the TNAT may be stored in the remote database 114 for a pre-determined amount of time. For example, the TNAT may be stored in the remote database 114 for 7 days. In this regard, the TNAT will be deleted from the remote database 114 after 7 days from when the TNAT was stored in the remote database 114.

By way of another example, the airport staff member may enter one or more flight details of the traveler whose name they wish to pronounce to retrieve the audio recording from the remote database 114. For instance, the airport staff member may enter the flight number, date, departure airport, and arrival airport, to generate the TNAT. In this regard, the list of the passengers may include their associated audio recordings, such that the airport staff member may select the traveler whose name they wish to pronounce to retrieve the audio recording from the remote database 114.

The remote database 114 may be a secured and globally synchronized database. For example, the remote database 114 may be accessed at all airports, after the user is authenticated. For instance, the remote database 114 may only be accessed with valid credentials (e.g., passcode, user name, or the like).

The user device 102 may include or be coupled to one or more audio speaker devices 120 configured to play the audio recording. For example, the one or more audio speaker devices 120 may be internal speaker devices. For instance, the user device 102 may include one or more speakers 120 (e.g., one or more loud speaker assemblies 120). In this regard, the one or more speakers 120 of the user device 102 may play the audio recording. By way of another example, the user device 102 may couple to an external speaker device. For instance, the external speaker device may be configured to play the audio recording retrieved from the remote database using the user interface of the user device.

It is noted herein that the audio recording output of the internal speaker device of the user device may be amplified by placing the internal speakers in close proximity to an additional speaker device (e.g., an intercom system, or the like).

Figure 5A:
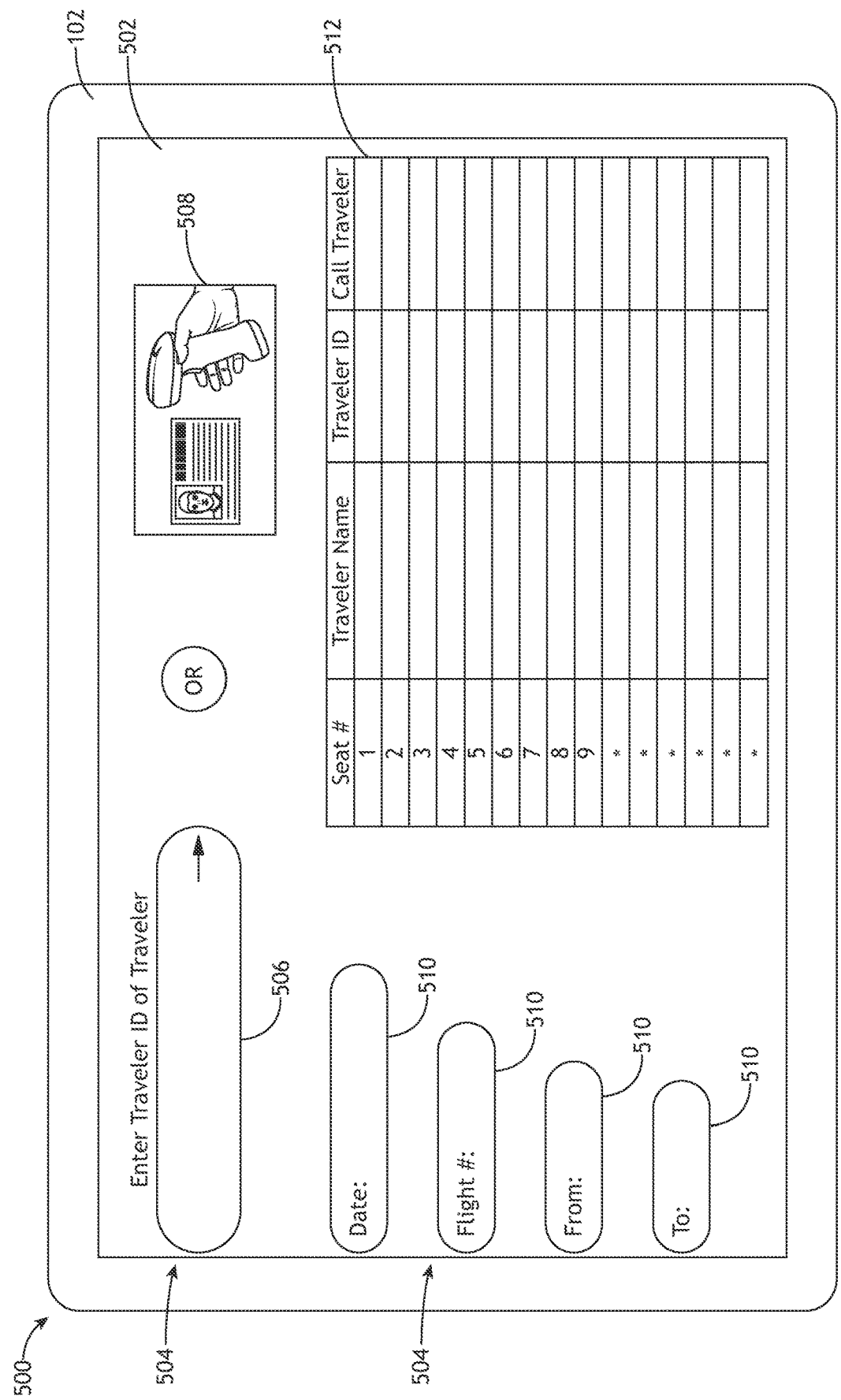
FIG. 5A illustrates a simplified schematic of an example user interface for collecting an audio recording and generating a traveler name announcement table, in accordance with one or more embodiments of the disclosure.
Figure 5B:
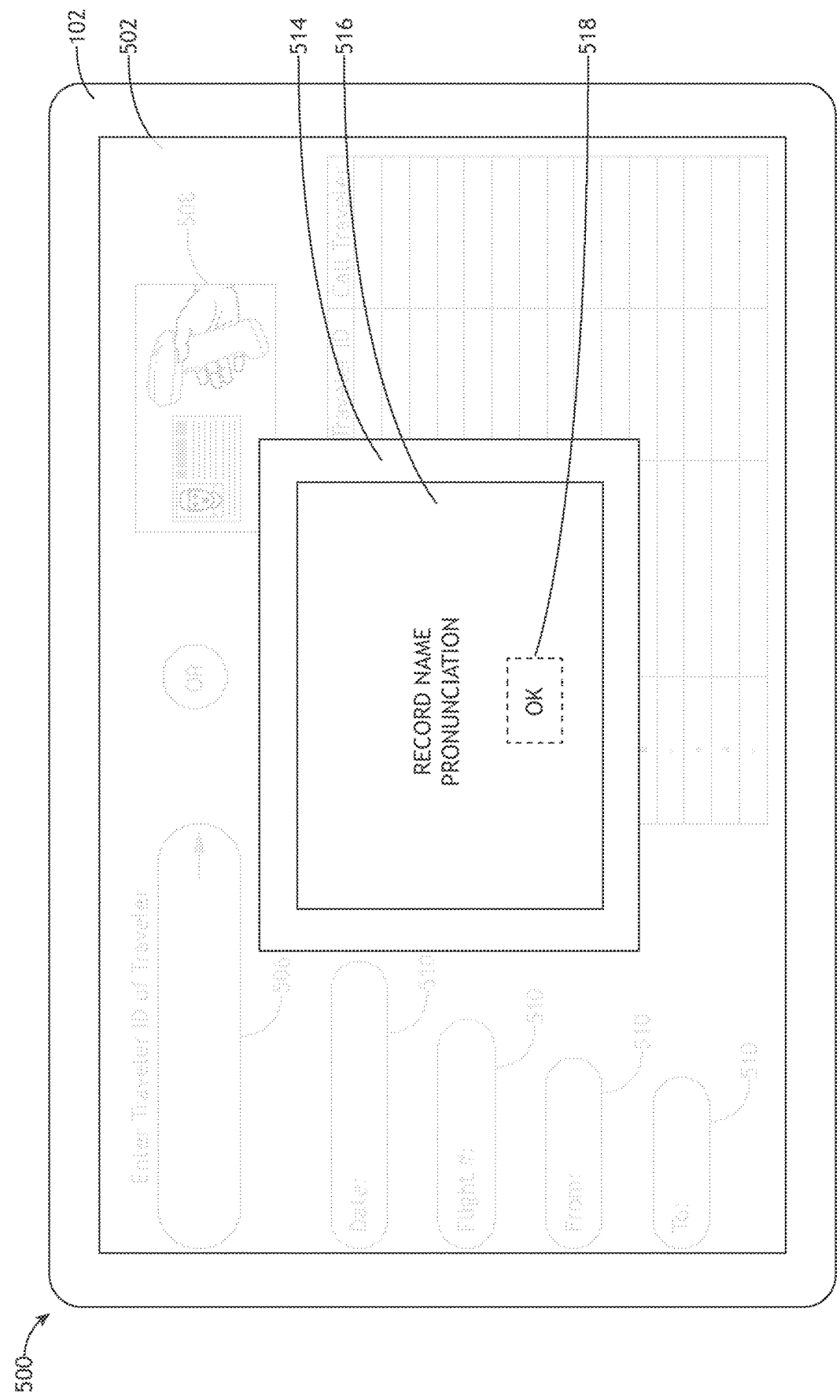
FIG. 5B illustrates a simplified schematic of an example user interface of the system including a pop-up window prompting a traveler to record an audio recording, in accordance with one or more embodiments of the disclosure.
Figure 5C:
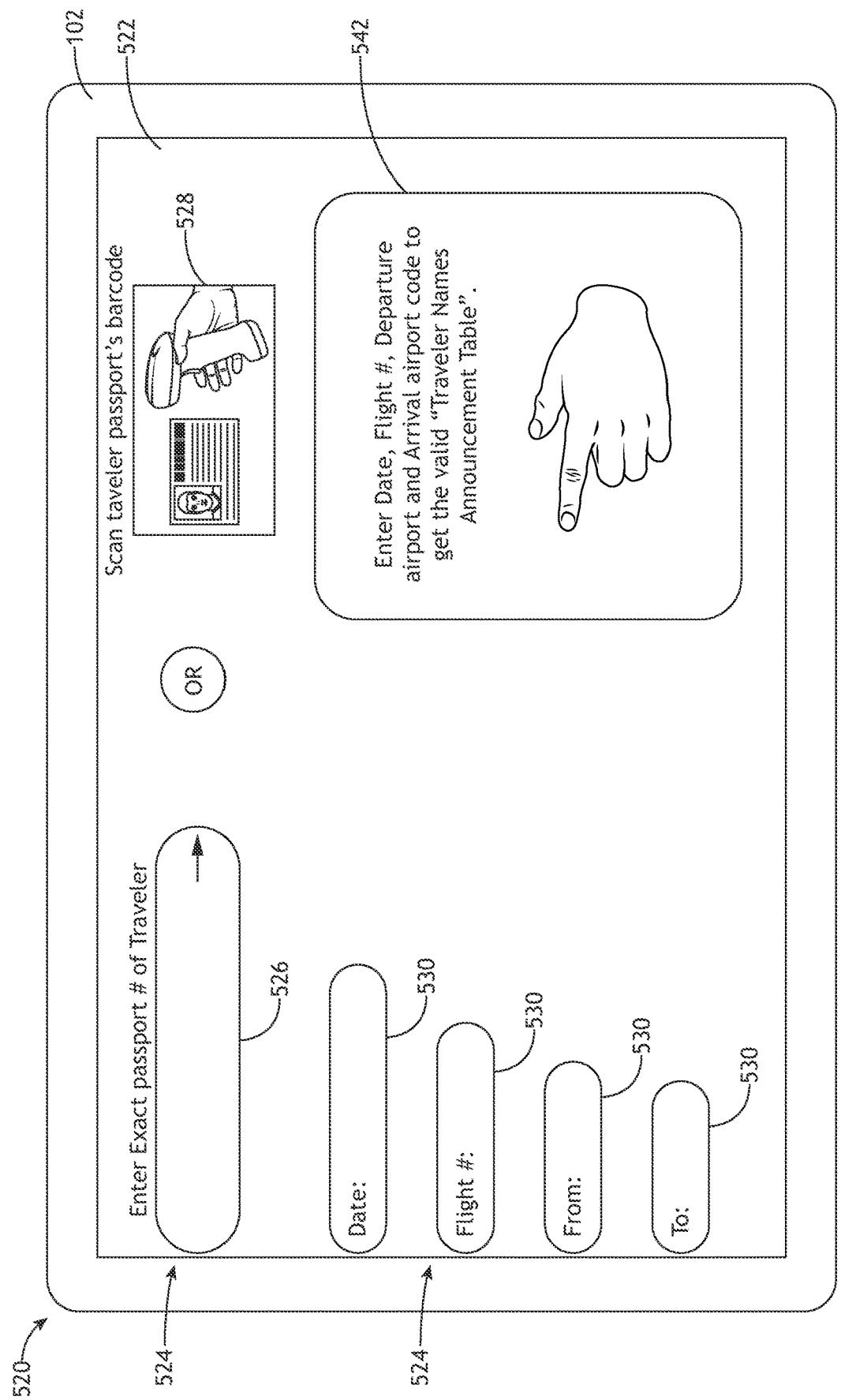
FIG. 5C illustrates a simplified schematic of an example user interface for retrieving a traveler name announcement table, in accordance with one or more embodiments of the disclosure.
Figure 5D:
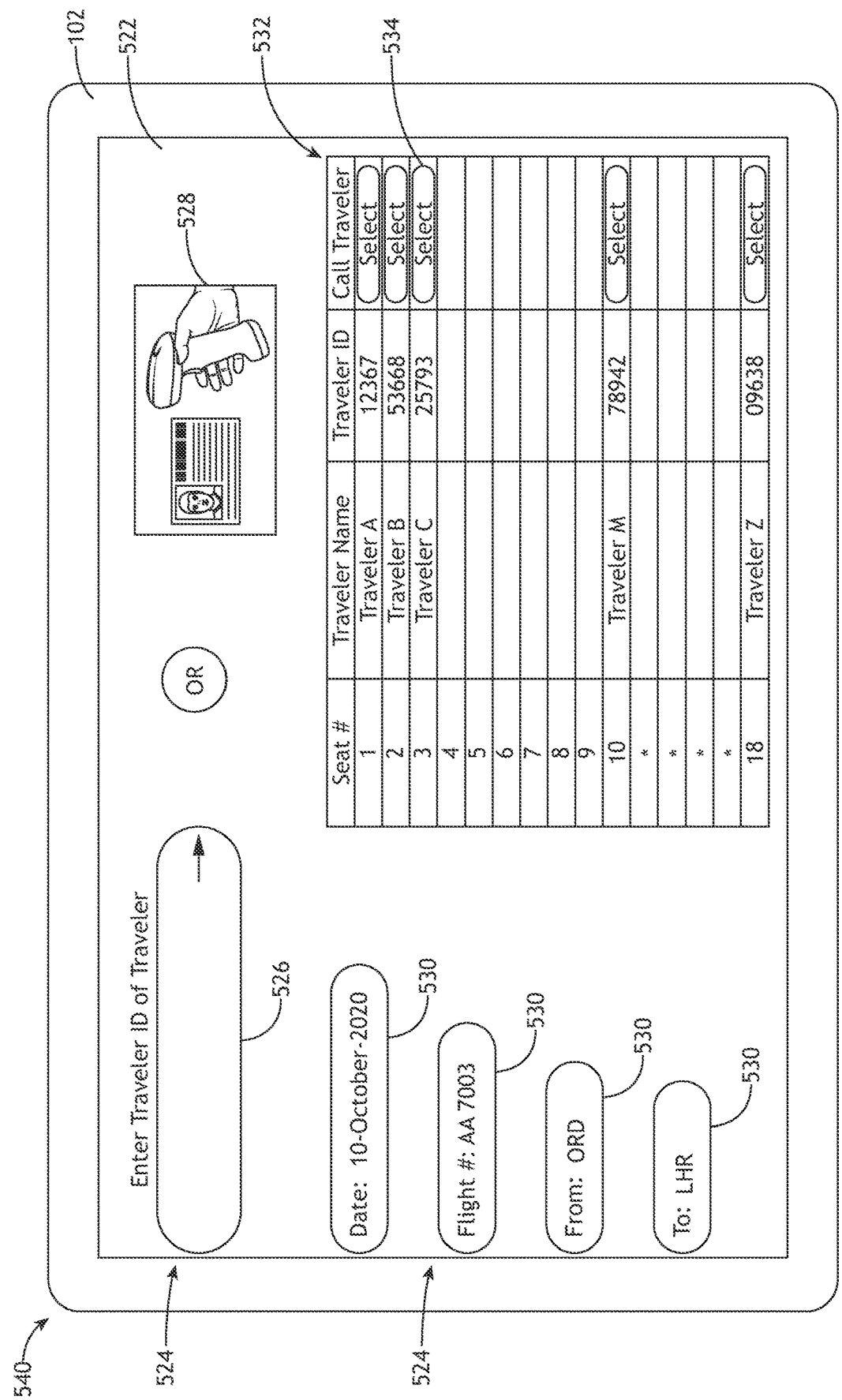
FIG. 5D illustrates a simplified schematic of an example user interface for retrieving the collected audio recording, in accordance with one or more embodiments of the disclosure.

FIGS. 5A-5D illustrate simplified schematics of example user interfaces 500, 520, of the system 100, in accordance with one or more embodiments of the present disclosure. In particular, FIGS. 5A-5B depict an example user interface 500 for collecting the audio recordings and generating a traveler name announcement table. For example, the application installed on the user device 102 of the system 100 may be configured to launch the user interface 500 before an airport staff member scans the traveler's travel document 202, enters the traveler ID, or generates a traveler name announcement table. In particular, FIGS. 5C-5D depict example user interfaces 520, 540 for retrieving the audio recordings from the remote database 114. For example, the application installed on the user device 102 of the system 100 may be configured to launch the user interface 520 when an airport staff members needs to announce a traveler's name.

Referring to FIG. 5A, the screen 502 of the user device 102 may include a graphical user interface (GUI) 500, where the GUI 500 includes one or more GUI windows. For example, the one or more GUI windows may include one or more search fields 504. In one instance, as shown in FIG. 5A, the GUI 500 may include a traveler ID search field 506. In this regard, when an airport staff member is retrieving the traveler ID to determine whether the remote database 114 includes a stored audio recording matching the travel ID, the airport staff member may enter the traveler ID located on the travel document 202 (e.g., enter the traveler's passport number). In another instance, the GUI 500 may include a scan icon 508. In this regard, when an airport staff member is retrieving the traveler ID to determine whether the remote database 114 includes a stored audio recording matching the travel ID, the airport staff member may scan the tag 204 on the travel document 202 (e.g., enter the traveler's passport number) to retrieve the traveler ID. It is noted herein that the scan icon 508 may be interactive, such that the airport staff member may interact with the scan icon 508 prior to scanning the tag 204 on the travel document 202. Further, it is noted herein that the scan icon 508 may be non-interactive, such that the system 100 may be configured to detect when the traveler ID is retrieved via the scanning device 116.

After the traveler ID is retrieved (e.g., by entering the ID into the search field 506 or scanning the tag 204), the one or more controllers 104 of the system 100 may be configured to determine whether the remote database 114 includes a stored audio recording associated with the retrieved traveler ID. For example, the one or more controllers 104 of the system 100 may be configured to determine whether the contents of the remote database 114 (as shown in FIG. 4) include a stored audio recording matching the traveler ID.

Referring to FIG. 5B, if the remote database 114 does not include a stored audio recording associated with the retrieved traveler ID, the GUI 500 may display a GUI window 514 including a pop-up message 516. For example, the GUI 500 may display a pop-up message 516 to alert the traveler that the remote database 114 does not include a stored audio recording and an audio recording of the correct pronunciation of the traveler's name will need to be collected.

The audio recording device 116 may begin recording the correct pronunciation of the traveler's name in response to a user selection of a portion of GUI. For example, the audio recording device 116 may begin recording the pronunciation of the traveler's name in response to a user selecting a "OK" button 518, "begin recording" button, or a similar button. The audio recording device 116 may automatically begin recording the correct pronunciation of the traveler's name (e.g., without engaging with the GUI 500). For example, the GUI 500 may display a countdown before the audio recording device 116 begins recording the correct pronunciation of the traveler's name.

Once the audio recording is collected and stored in the remote database 114, a table 512 may be generated for each flight departing from one airport to another on a specific date. The table 512 may include seat numbers as an index.

The system 100 may be configured to tag each seat number with the traveler's full name as it appears on the traveler's passport, traveler ID (e.g., passport number) and traveler name's audio clip stored in the remote database. For example, the system 100 may be configured to automatically tag each seat number with the traveler ID, data, and audio recording. For instance, the one or more controllers 104 may be communicatively coupled to a database including the seat assignments for that specific flight, such that the one or more controllers may be configured to match the traveler data associated with the seat assignment and the data of the remote database (e.g., traveler ID, audio clip, traveler data, and the like) in order to tag the seat number with the corresponding information. By way of another example, while issuing the boarding pass, for each seat, the tag 204 will be scanned to tag that seat number to its traveler's full name, traveler ID (e.g., passport number) and audio recording.

In a non-limiting example, a traveler is a passenger of flight #AA 7003 departing from O'Hare International Airport, Chicago (ORD) to Heathrow Airport, London (LHR). During the check-in process at the check-in counter, the traveler's travel document will be scanned by the airport staff member to determine whether the remote database includes an audio recording for that specific traveler. The airport staff member may click the seat number of the traveler (e.g., seat 1) and scan the tag 204 on the traveler's travel document 202. Upon scanning, the remote database 114 will be searched to determine whether the database 114 includes an audio recording for that specific traveler. In the event that the remote database 114 includes a stored audio recording for that specific traveler, the table 512 may be generated. In the table, the seat 1 row would include the traveler ID, the traveler's name, and the associated audio clip for that traveler. A similar row would be generated for each passenger on the flight #AA 7003. In the event that the remote database 114 does not include a stored audio recording for that specific traveler, the traveler will be prompted to record an audio recording and after the recording is collected the table 512 (e.g., TNAT) may be generated. As shown in FIG. 4B, once the traveler check-in process is done, the generated TNAT will be stored against the flight's departure date, Flight #, Departure airport code, and arrival airport code in the remote database 114, such that the generated TNAT may be retrieved later by entering the correct flight details.

Referring to FIG. 5C, the screen 502 of the user device 102 may include a graphical user interface (GUI) 520, where the GUI 520 includes one or more GUI windows. For example, the one or more GUI windows may include one or more search fields 524. In one instance, as shown in FIG. 5C, the GUI 520 may include a traveler ID search field 526. In this regard, an airport staff member may be able to retrieve the audio recording from the remote database 114 by searching the traveler ID (e.g., passport number) of the traveler whose name the staff member wishes to announce. In another instance, the GUI 520 may include a scan icon 528. In this regard, an airport staff member may be able to retrieve the audio recording from the remote database 114 by scanning the tag 204 of the travel document. It is noted herein that the scan icon 528 may be interactive, such that the airport staff member may interact with the scan icon 528 prior to scanning the tag 204 on the travel document 202.

Further, it is noted herein that the scan icon 528 may be non-interactive, such that the system 100 may be configured to retrieve the audio recording from the remote database 114 automatically (e.g., without the user interacting with the scan icon 528).

The GUI 540 may display a table 532 generated for a particular flight. As shown in FIG. 5C, the system 100 may be configured to retrieve the table 532 in response to a user input of one or more flight details 530 (e.g., flight's departure date, flight number, departure airport's name code and arrival airport's name code, and the like) into the GUI 520. For example, the GUI 520 may include a window 542 (or pop-up message) to prompt the airline staff member to enter the one or more flight details 530 into the one or more search fields 524. As shown in FIG. 5D, the table 532 may include one or more columns (e.g., seat number, traveler name, traveler ID, audio recording, and the like). In the audio recording column, the GUI 540 may include a button 534. If the airport staff member does not have the traveler ID or access to the tag 204, the airport staff member may retrieve the audio recording from the remote database 114 by selecting the "select" button 534 on the GUI 520. By selecting the "select" button 534, the airport staff member can announce the particular traveler's name by clicking on the "select" button. The "select" button may be configured as the play button, such that the traveler's name audio recording mapped to traveler's traveler ID is played. For example, by selecting the "select" button, the one or more controllers 104 may be configured to generate one or more control signals configured to cause the user device 102 to play the audio recording retrieved from the remote database 114. It is noted herein that retrieval using the TNAT will be useful at the boarding gate when airline staff need to announce a plurality of travelers' names on that particular flight.

Figure 6:
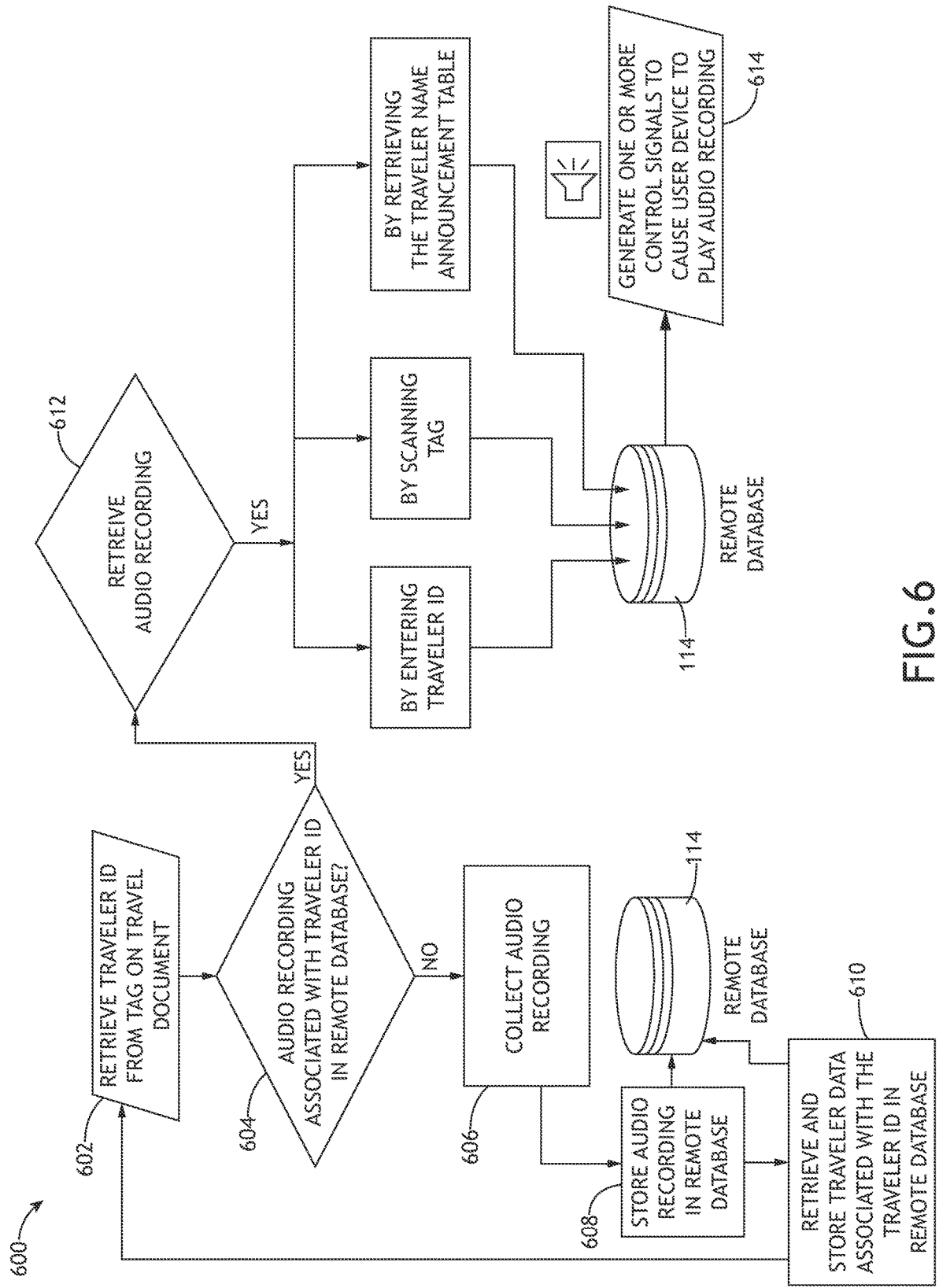
FIG. 6 illustrates a flow diagram depicting a method or process for announcing the correct pronunciation of travelers' names, in accordance with one or more embodiments of the disclosure.

FIG. 6 illustrates a method or process 600 for announcing the correct pronunciation of a traveler's name, in accordance with one or more embodiments of the present disclosure.

In step 602, a traveler ID is retrieved from a travel document. For example, a scanning device 116 of the system 100 may be configured to retrieve the traveler ID from the travel document 202. By way of another example, the traveler ID may be displayed on the travel document and retrieved from the face of the travel document 202. In this regard, the system 100 may retrieve the traveler ID upon manually entry by an airport staff member.

The scanning device 116 may include any scanning device 116 known in the art. For example, the user device 102 may be a mobile device equipped with scanning functionality. In this regard, the mobile device 102 may include a camera. By way of another example, the user device 102 may couple to an external device equipped with scanning functionality. In this regard, the user device 102 may couple to a barcode reader communicatively couplable to the user device.

The travel document 202 (e.g., a passport 202, boarding pass, driver's license, train ticket, plane ticket, or the like) may include a tag 204. For example, the tag 204 may incorporate a barcode, QR-code, or similar machine-readable encoding to encode traveler identification (ID) information (e.g., name, residence information, birth date, passport number, social security number, contact information, and the like). For instance, the tag 204 of the passport 202 and its incorporated code may correspond to a traveler ID unique to that traveler. In this regard, the unique traveler ID encoded in the barcode may be different for each traveler, such that a remote database 114 can store traveler data along with the unique traveler ID, which is discussed further herein.

The scanning device may be configured to scan and decode the tag 204 to retrieve the traveler ID from the tag 204.

In step 604, the remote database 114 may be searched to determine whether the remote database 114 includes a stored audio recording associated with the retrieved traveler ID retrieved in step 602.

In step 606, if the remote database 114 does not include a stored audio recording associated with the retrieved traveler ID, a new audio recording may be collected. For example, an audio recording device 118 may be configured to record the traveler pronounce his/her name. By way of another example, an audio recording device 118 may be configured to record a person familiar with the traveler pronounce the traveler's name. For instance, the audio recording device 118 may be configured to record a parent/guardian pronounce his/her child's name. By way of another example, if a traveler is unable to speak or has difficulty speaking, the audio recording device 118 may be configured to record the traveler's name in a standard voice when prompted by an airport staff member. For instance, the airport staff member may ask the traveler to indicate through the use of non-verbal communication whether or not the airport staff member is correctly pronouncing the traveler's name, and if so, the airport staff member can prompt a virtual voice assistant (e.g., Siri, Alexa, Google Assistant, or the like) to pronounce the traveler's name in the standard voice of the virtual voice assistant.

If the remote database 114 does include a stored audio recording associated with the retrieved traveler ID, then a new audio recording does not need to be collected. It is noted herein that the collection of the audio recording is a one-time event and is not flight specific, such that once the audio recording is collected and stored, the traveler does not need to re-record the audio recording prior to subsequent flights. In the event that the recording is defective (e.g., the recording is staticky) or the pronunciation is incorrect, the prior recording may be deleted and a new recording may be stored in the database. For example, the prior recording may be manually deleted by an airport staff member prior to the collection of the new recording. By way of another example, the prior recording may be automatically deleted (or overwritten) upon collection of the new audio recording. In this regard, the new audio recording may replace/override the old audio recording stored in the remote database 114.

In step 608, the new traveler audio recording associated with the traveler ID (collected in step 606) is stored in the remote database 114. Prior to storing the audio recording in the remote database 114, the system 100 may be configured to receive the audio recordings in a non-standardized format and convert the audio recordings from the non-standardized format to a standardized format. In this regard, user devices operating on different operating systems may nevertheless be able to retrieve the various audio recordings collected by the various user devices. Further, user devices operating on different operating systems may nevertheless be able to retrieve the correct audio recording associated with a specific unique traveler ID (e.g., the audio recording is correctly paired with the unique traveler ID).

For example, the audio recordings may be received in a non-standardized format from the audio recording device 118 and automatically converted into a standardized format prior to storage by the one or more controllers 104. By way of another example, the audio recordings may be received in a non-standardized format from the audio recording device 118 and automatically converted into a standardized format prior to storage by a centralized server. By way of another example, the audio recordings may be received in a non-standardized format from the audio recording device 118 and manually converted into a standardized format prior to storage by airport personnel.

In some embodiments, the system may receive the audio recordings in various file formats and convert the non-standardized file formats into standardized file formats prior to storing in the remote database 114. For example, the one or more controllers 104 may be configured to receive the audio recordings in non-standardized file formats and convert the audio recordings into a standardize file format (e.g., mp3, WAV, FLAC, and the like). By way of another example, the remote database 114 may be configured to receive the audio recordings in non-standardized file formats and convert the audio recordings into a standardize file format (e.g., mp3, WAV, FLAC, and the like). In some embodiments, the system may be configured to receive the audio recordings in various file formats and store the audio recordings in the remote database 114 in the various file formats (e.g., without converting the audio file format into a standardized file format).

In step 610, traveler data associated with the traveler ID may be retrieved and stored in the remote database 114. The traveler data may include the name of the traveler. For example, the remote database 114 may store the traveler's name audio recording against the traveler data retrieved from the travel document. In one instance, the traveler data may be manually retrieved from the travel document and entered into the system 100. In another instance, the traveler data may be automatically retrieved by the scanning device 116 from the tag 204 on the travel document.

In step 612, the audio recording may be retrieved from the remote database For example, the airport staff member may scan the tag 204 from the traveler's travel document 202 to retrieve the audio recording from the remote database 114. In this regard, the user device 102 may display the tag 204 and an external scanning device 116 may be used to scan the tag 204 to retrieve the audio recording stored in the remote database. In another instance, the airport staff member may have a copy of the tag 204 from the traveler's travel document 202. In this regard, the airport staff member may scan the tag 204 (external to the system 100) to retrieve the audio recording stored in the remote database 114.

By way of another example, the airport staff member may enter the traveler ID of the traveler whose name they wish to pronounce to retrieve the audio recording from the remote database 114.

By way of another example, the airport staff member may enter one or more flight details of the traveler whose name they wish to pronounce to retrieve the audio recording from the remote database 114. For instance, the airport staff member may enter the flight number, date, departure airport, and arrival airport to retrieve the TNAT including a list of the passengers on that flight. In this regard, the list of the passengers may include their associated audio recordings, such that the airport staff member may select the traveler whose name they wish to pronounce to retrieve the audio recording from the remote database 114.

In step 614, one or more control signals are generated to cause the user device to play the retrieved audio recording are generated. For example, an audio speaker device 118 of the system 100 may be configured to play the audio recording retrieved in step 610. In one instance, the audio recording may be played via the audio speaker device at an audible sound, such that the traveler can recognize that their presence is being requested or their attention is required.

By way of another example, an audio speaker device 118 of the system 100 may be configured to play the retrieved audio recording into a speaker of an announcement system (e.g., an intercom).

By way of another example, the user device 102 may be communicatively coupled to an announcement system including an audio speaker device 118.

It is noted herein the method or process above is not limited to the steps and/or sub-steps provided. For example, the method or process may include more or fewer steps and/or sub-steps. In addition, the method or process may perform the steps and/or sub-steps simultaneously. Further, the method or process may perform the steps and/or sub-steps sequentially, including in the order provided or an order other than provided. Therefore, the above description should not be interpreted as a limitation on the scope of the disclosure but merely an illustration.

Although the system and method above are directed to a system and method for announcing the correct pronunciation of a traveler's name, the system and method may also be used as a security check to determine whether the traveler pronunciation of his/her name matches the audio recording stored in the remote database.

The one or more processors 106 may include any one or more processing elements known in the art. In this sense, the one or more processors 106 may include any microprocessor device configured to execute algorithms and/or program instructions. In general, the term "processor" may be broadly defined to encompass any device having one or more processing elements, which execute a set of program instructions from a non-transitory memory medium (e.g., the memory 108), where the one or more sets of program instructions are configured to cause the one or more processors 106 to carry out any of one or more process steps.

The memory 108 may include any storage medium known in the art suitable for storing the one or more sets of program instructions executable by the associated one or more processors 106. For example, the memory 108 may include a non-transitory memory medium. For instance, the memory 108 may include, but is not limited to, a read-only memory (ROM), a random access memory (RAM), a magnetic or optical memory device (e.g., disk), a magnetic tape, a solid state drive, and the like. The memory 108 may be configured to provide display information to the user device 102. In addition, the memory 108 may be configured to store user input information from one or more user input devices. The memory 108 may be housed in a common controller housing with the one or more processors 106. The memory 108 may, alternatively or in addition, be located remotely with respect to the spatial location of the processors 106 and/or the one or more controllers 104. For instance, the one or more processors 106, the one or more controllers 104 may access a remote database 114, accessible through a network (e.g., internet, intranet, and the like) via one or more communication interfaces.

The one or more communication interfaces 112 may be operatively configured to communicate with one or more components of the one or more controllers 104 and/or the one or more components of the remote database 114. For example, the one or more communication interfaces may also be coupled (e.g., physically, electrically, and/or communicatively) with the one or more processors 106 to facilitate data transfer between components of the one or more components of the one or more controllers 104 and/or the one or more components of the remote database 114 and the one or more processors 106. For instance, the one or more communication interfaces may be configured to retrieve data from the one or more processors 106, or other devices, transmit data for storage in the memory 108, retrieve data from storage in the memory 108, or the like.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for announcing the correct pronunciation of a traveler's name, comprising:
   one or more controllers communicatively coupled to one or more user devices, the one or more controllers including one or more processors configured to execute one or more program instructions causing the one or more processors to:
      retrieve a traveler ID from a tag on a travel document using a scanning device of the one or more user devices;
      determine whether a remote database includes a stored audio recording associated with the retrieved traveler ID;
      collect an audio recording if the remote database does not include the stored audio recording associated with the retrieved traveler ID using an audio recording device of the one or more user devices, the audio recording device being configured to record the pronunciation of a traveler name;
      receive the audio recording in a non-standardized format from the audio recording device;
      convert the audio recording received in the non-standardized format to a standardized format;
      retrieve traveler data associated with the retrieved traveler ID, the traveler data including a name of a traveler;
      store the converted audio recording in the standardized format in the remote database along with the retrieved traveler ID and the retrieved traveler data;
      retrieve the converted audio recording from the remote database based on the retrieved traveler ID; and
      generate one or more control signals configured to cause an audio speaker device of the one or more user devices to play the retrieved audio recording.

2. The system of claim 1, wherein the one or more controllers are configured to retrieve the converted audio recording from the remote database in response to a user input.

3. The system of claim 2, wherein the user input includes entering the retrieved traveler ID manually into a search field of a user interface of the one or more user devices.

4. The system of claim 2, wherein the user input includes entering the retrieved traveler ID by scanning the tag of the travel document.

5. The system of claim 1, wherein the one or more controllers further configured to:
   generate a table in response to a user input of one or more flight details, the table including the retrieved traveler ID, the stored audio recording, the one or more flight details, and the retrieved traveler data;

store the generated table in the remote database; and retrieve the table from the remote database in response to a user input of the one or more flight details, the one or more controllers configured to retrieve the converted audio recording from the remote database in response to a user selection of the stored audio recording in the retrieved table.

6. The system of claim 1, wherein the one or more user devices include a mobile device.

7. The system of claim 6, wherein the scanning device includes a camera of the mobile device.

8. The system of claim 1, wherein the one or more user devices include a desktop computer.

9. The system of claim 8, wherein the scanning device includes a barcode reader.

10. The system of claim 1, wherein the one or more user devices include a self-check-in kiosk including a barcode reader.

11. The system of claim 1, wherein the audio recording device is configured to record a traveler pronounce their name.

12. The system of claim 1, wherein the audio recording device is configured to record a traveler pronounce a family member's name.

13. The system of claim 1, wherein the audio recording device is configured to record a voice-assisted model pronounce the name of a traveler in a standard voice of the voice-assisted model.

14. The system of claim 1, wherein an output of the audio speaker device of the user device is amplified by placing the audio speaker device of the user device in close proximity to an intercom system.

15. A method for announcing the correct pronunciation of a traveler's name, comprising:

retrieving a traveler ID from a tag on a travel document;

determining whether a remote database includes a stored audio recording associated with the retrieved traveler ID;

collecting an audio recording if the remote database does not include the stored audio recording associated with the retrieved traveler ID using an audio recording device, the audio recording device being configured to record the pronunciation of a traveler name;

receiving the audio recording in a non-standardized format from the audio recording device;

converting the audio recording received in the non-standardized format to a standardized format;

retrieving traveler data associated with the retrieved traveler ID, the traveler data including a name of a traveler;

storing the converted audio recording in the standardized format in the remote database along with the retrieved traveler ID and the retrieved traveler data;

retrieving the converted audio recording from the remote database based on the retrieved traveler ID; and generating one or more control signals configured to cause an audio speaker device to play the retrieved audio recording.

* * * * *